United States Patent
Taniguchi et al.

[11] Patent Number: 5,387,330
[45] Date of Patent: Feb. 7, 1995

[54] MIXED IONIC CONDUCTORS

[75] Inventors: Noboru Taniguchi, Osaka; Junji Niikura, Hirakata; Kazuhito Hatoh, Daitou; Takaharu Gamo, Fujiidera, all of Japan

[73] Assignee: Matsushita Electric Industrial Co., Ltd., Osaka, Japan

[21] Appl. No.: 913,958

[22] Filed: Jul. 17, 1992

[30] Foreign Application Priority Data

Jul. 17, 1991 [JP] Japan .................. 3-176700

[51] Int. Cl.$^6$ .................. G01N 27/406; G01N 27/407
[52] U.S. Cl. .................. 204/421; 204/424; 429/33; 429/193
[58] Field of Search .................. 421/153.18, 421–429; 429/30, 33, 191, 193

[56] References Cited

U.S. PATENT DOCUMENTS 4,851,303 7/1989 Madou et al. .................. 429/33

FOREIGN PATENT DOCUMENTS 2206571 1/1989 United Kingdom .

OTHER PUBLICATIONS

Solid State Ionics vol. 35, 1989, (month unavailable) Ansterdam NL, pp. 179–188, 0XP000132464 N. Bonanos et al., "Ionic Conductivity of Gadolinium–Doped Barium Cerate Perovskite" *p. 179, left column, line 1, p. 181, left column, line 20* *the whole document*.
Solid State Ionics vol. 45, 1991(month unavailable), Amsterdam NL, pp. 111–115, 0XP000243501 R. C. T. Slade et al. "Systematic Examination of Hydrogen Ion Conduction in Rare–Earth Doped Barium Cerate Ceramics" *the whole document*.
Journal of the American Ceramic Society, vol. 64, No. 8, Aug. 1981, Columbus US, pp. 479–485, I. Riess et al. "Density and Ionic Conductivity of Sintered (CE02) 0.82(Gd01.5)0.18" *p. 480, left column, line 3–p. 482, right column, line 25; figure 2*.
"Proton Conduction in Sintered Oxides" in Solid States Science and Technology written by H. Iwahara et al. in J. Electrochem. S,135 (1988)(month unavailable) 529.

Primary Examiner—T. Tung
Attorney, Agent, or Firm—Wenderoth, Lind & Ponack

[57] ABSTRACT

The present invention relates to a mixing ion conductive material for use in an electrochemical device such as a fuel cell or a sensor and more particularly to the super ion conductive material based on protons or oxide cations and also to a synthesizing method of the mixing ion conductive material.

A mixing ion conductive oxide which has a proton conductivity and/or oxide cation conductivity and has a composition comprising 1 mol of barium oxide, 1-x mol of cerium oxide and x mol of gadolinium oxide; wherein $1 > x > 0.1$. When $x = 0.2$, the mixing ion conductive material shows a conductivity shown in FIG. 2. The oxide sintered body mentioned above has a density higher than 96.5% of the theoretical density and a grain size of 0.1 to 10 micron. The synthesizing method of the oxide sintered body is characterized by that the powders for use in the final heat treatment is crushed into a particle size less than 3 micron and is subjected to a vacuum drying process. Further, the sintering temperature is specified to a temperature between 1635° C. and 1665° C.

5 Claims, 4 Drawing Sheets

MIXED IONIC CONDUCTORS

BACKGROUND OF THE INVENTION

1. Field of the Invention

The present invention relates to a mixed ionic conductor used for an electrochemical device such as a fuel cell or a sensor.

2. Prior Art

As an ionic conductor material, there are three types, a solution type, a molten salt type or a solid state type. Almost all of devices based on an electrochemical reaction such as a cell, a sensor or a fuel cell use mainly either one of the solution type conductor and the molten salt type conductor having a conductivity higher than that of the solid state type conductor. However, it has been desired to realize an electrochemical device provided with a solid state conductor which is not evaporated, lost or leaked out.

A solid material of an ionic crystal shows a variety of ion conductivity due to a diffusion of ions in the crystal at a temperature close to the melting point. In 1914, Tubant and others found Silver ion conductive material (AgI) which has a ion conductivity comparable to that of the solution at a temperature much lower than the melting point. In the age of 1960, there was discovered a stabilized zirconia which is an oxygen ion conductor and Na-$\beta$-alumina which is a sodium ion conductor. Various researches have been directed to a discovery of an ion conductor showing an ion conductivity which is large at a temperature as low as possible. Since then, much attention has been paid to the ion conductor applicable for various kinds of sensors, solid state cell, various kinds of memory devices, display devices or fuel cell.

On the other hand, there is reported a bismuth oxide and a cerium oxide which have a high ion conductivity above 600° C. except for the stabilized zirconia. However, since these materials are poor in the resistance to a reducing atmosphere and are unstable in the chemical reaction, these materials are not suitable for the electrochemical device especially for a fuel cell. There are various papers to report ionic conductors which comprise a variety of complex oxides but most of such oxides show a low ion conductivity and a poor chemical stability. However, it is found that some oxides in a perovskite structure show a high chemical stability and a high ion conductivity due to mixed ion conductivity of the protons and oxide cations, which conductivity is close to that of YSZ (yttrium stabilized zirconia) at 1000° C. A variety of researches have been directed to $BaCeO_{3-\alpha}$ added with a third additives among the above oxides in a perovskite structure. In connection with the third additives, the following ion conductivity is reported in the literature of H. Iwahara et al, J. Electrochem. S, 135,(1988)529: At 1000° C., $8 \times 10^{-2}$ S/cm ($BaCe_{0.9}(Y, Nd$ and $Sm)_{0.1}O_{3-\alpha}$); at 800° C., $4.3 \times 10^{-2}$ S/cm and at 600° C., $1.6 \times 10^{-2}$ S/cm ($BaCe_{0.85} Gd_{0.15} O_{3-\alpha}$).

N. Bonanos and others carried out a systematic research on $BeCe_{1-x} Gd_x O_{3-\alpha}$ complex compound and filed a UK Patent Application No. 8716147 which was published under Publication No. GB 2206571 A. However, sintered samples used in the reseach do not reach to 92% of theoretical density. The synthesizing process for the sintered material has a fair problem. The disclosure of Solid State Ionics, 35,(1989)179. shows that the highest ion conductivity of the sintered material is obtained with x=0.15 in the above complex formula.

However, there has been no report on the ionic conductor which is chemically stable to a same degree as that of YSZ and has a ion conductivity higher than that of YSZ. In order to make an electrochemical device in a solid state where no evaporation, loss or a leak of the electrolyte occur, it is necessary to find a material having a high chemical and thermal stability as well as a high ion conductivity and its synthesizing method. Therefore, an object of the present invention is to provide an ionic conductor provided with the above properties.

Another object of the present invention is to provide the method for synthesizing the ionic conductor material.

Other objects of the present invention will appear in the course of the description thereof follows.

SUMMARY OF THE INVENTION

In order to achieve the object mentioned above, the present invention is to provide a mixed ionic conductor composed of an ion conductive oxide which shows a proton conductivity together with an oxide cation conductivity, by which an increased total ion conductivity can be obtained.

Typically, a conventional ionic conductor for a fuel cell with a solid state electrolyte may belongs to either one of the proton conductive type and the oxide cation conductive type. A perovskite oxide of BaCeO3 belongs to the oxide cation conductive type. In the case of this type oxide, it is reported that by addtion of certain elements thereto the perovskite oxide shows a proton conductivity. The mechanism of generating a proton conductivity is reported in "H. Uchida, et al, Solid State Ionics 34" as follows.

$$V_o + \tfrac{1}{2}O_2 \rightarrow O_o + 2h\cdot \quad (1)$$

$$H_2O + 2h\cdot \rightarrow 2H\cdot + \tfrac{1}{2}O_2 \quad (2)$$

$$H_2O + V_o \rightarrow 2H\cdot + O_o \quad (3)$$

$$H_2 + 2h\cdot \rightarrow 2H\cdot \quad (4)$$

That is, as shown in the above reaction formula (1), at the same time when oxygen is dopped into oxygen defect lattice, two holes are produced. If water is present, the hole tends to take back oxygen from the water as shown in the reaction formula (2) to maintain the electric neutral. At the time, hydrogen ion having a plus charge (proton), may occur. Combination of the formulae (1) and (2) makes the reaction formula (3). Further, under a hydrogen atmosphere, hydrogen gas incorporates two holes to generate two protons as shown in the reaction formula (4).

In general, the oxide cation conductor tends to transfer ions due to a defect lattice (Flenkel defect) incorporated with an oxide cation or cations as shown in the below formula:

$$V_o + \tfrac{1}{2}O_2'' \rightarrow O_o$$

The ion conductivity is realized by diffusion due to concentration gradient of the defect. It is believed that the oxide cation conductivity has an intimate relation with a defect concentration and the specific conductance decreases due to association phenomenon (complex formation) of the vacancy $V_o$, formation of the superlattice and so on. On the other hand, it is guessed that the occurence of proton conductivity is caused through hydration bonding, but such a detailed mechanism has not been known. Also, transfer mechanism of mixed ionic conductor provided with a proton conductivity and an oxide cation conductivity has not been known clearly.

However, as a result of our sharp study, we have found that the conductivity of the proton and the oxide cation has an intimate relation with a crystal structure. That is, while Barium-Cerium oxide is an orthorhhombic system ($\alpha=\beta=\gamma=90°$, $a \neq b \neq c$ wherein $\alpha, \beta$ and $\gamma$ are crystal angles, a, b and c are crystal constants) close to a tetragonal system ($\alpha=\beta=\gamma=90°$, $a \neq b = c$), the crystal structure approaches to a tetragonal system by addition of rare earth elements having a larger ion radius and thereafter the distortion in the crystal structure increases. As shown in Fig.4, the structure dopped with Gd changes from $a \neq b = c$ to $a > b > c$. The more the dopped amount increases the more the lattice (a) expands. The oxide added with 15% or more of Gd comes to have a much distorted lattice and at the region of 20% of the addition amount there is obtained a peak value of b/c. As apparent from FIG. 3, the ion conductance variation corresponds to the distortion variation curve.

As the above result, the specific conductance may be indicated as product of the concentration of ionic species and the mobility (velocity). In the case of a sufficient concentration of the oxide cation and the proton, it is understood that the ratio of each ion mobilities ($H^+ > O^{2-}$) depends on the lattice distortion. It is found by us that the mixed ionic conductor having the proton and oxide cation conductivity shows a higher ionic conductivity at 1.010 or more of the lattice distortion b/c.

According to the above aspect, there is provided a mixed ionic conductor which comprises an ion conductive oxide represented by the formula: $BaCe_{1-x}M_xO_{3-\alpha}$ (I) wherein M is a rare earth element; $1 > x > 0$ and $1.5 > \alpha > 0$, and having at least a proton conductivity and a peovskite crystal structure belonging to an orthorhomic system.

In order to provide said mixed ionic conductor with the proton conductivity, it is necessary that at least one of the lattice constant ratios b/a, c/a and b/c has a peak value. Especially, in the case of $a > b > c$, it is preferable that the lattice constant ratio b/c is more than 1.010.

In the present invention, it is preferable that the rare earth element to be dopped may be selected from the group consisting of Y, Nd, Sin, Gd, Tb, Dy, Ho and Er, especially heavy rare earth elements such as Gd, Tb, Dy, Ho and Er which have a large ion radius, because those element are dopped in place of Ce to provide the perovskite crystal structure with the lattice distortion.

In the case of Gd, the general formula $BaCe_{1-x}M_xO_{3-\alpha}$ (I) indicates $BeCe_{1-x}Gd_xO_{3-\alpha}$ wherein x is preferably $0.23 > x > 0.16$ and $\alpha$ is $1.5 > \alpha > 0$, which has a proton conductivity and an oxide cation conductivity at a temperature ranging from 400° C. to 1000° C. It is more preferable that $BeCe_{1-x}Gd_xO_{3-\alpha}$ wherein $x = 0.2$. and the polycrystal sintered body has a density higher than 96.5% of the theoretical density and grain size ranging from 0.1 μm to 10 μm.

Further, the present invention is to provide a synthesizing method of an ion conductive sintered oxide comprising steps of; preparing an oxide particles to be subjected to a final sintering treatment and represented by the formula:

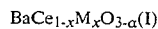

wherein M is a rare earth element; $1 > x > 0$ and $1.5 > \alpha > 0$ by using mixed raw powders of 1 mol of barium oxide, 1-x mol of cerium oxide and x mol of rare earth element, treating them in a non aqueous solvent, crushing them into a particle size less than 3 micron and drying the crushed mixture with a vacuum drying method at a temperature higher than 150° C.; pressing the dried mixture into a pressed body and sintering the pressed body at a temperature ranging from 1635° C. to 1665+ C. to provide a mixed ion conductive oxide with a density higher than 96.5% of the theoretical density.

In the embodiments for carring out the sythesizing method, the mixing ratio x is preferable given as follows; in the case of gadolinium oxide: $(0.23 > x > 0.16)$; in the case of Y oxide: $(0.25 > x > 0.17)$; in the case of Nd oxide: $(0.22 > x > 0.12)$; in the case of Sm oxide: $(0.21 > x > 0.13)$; in the case of Tb oxide: $(0.25 > x > 0.17)$; in the case of Dy oxide: $(0.25 > x > 0.17)$; in the case of Ho oxide: $(0.26 > x > 0.18)$; in the case of Er oxide: $(0.26 > x > 0.17)$. As apparent therefrom; the present invention is to provide an ion conductive oxide material different in the addition amount of gadolium from the conventional ion conductive oxide material and the synthesizing method of the oxide material different from the conventional method.

Accordingly, the inventive ion conductive oxide material comes to have a high chemical stability and a high thermal stability as well as a high ion conductivity. Especially, the ion conductive oxide material of a sintered body is provided with a higher ion conductivity and its superior stability. Further, the ion conductive oxide material of a polycrystal is very superior in the ion conductivity and its stability.

Since the oxide powders for use in a final sintering treatment are granulated into a specified particle size, it is possible to obtain a sintered body having a high density.

Since the oxide powders for use in a final sintering treatment are subjected to non-aqueous solvent process and a vacuum drying process, it is possible to obtain a sintered body having a chemically stable property.

Since the sintering temperature is determined at a specified range of a solid stat reaction, the sintered body is able to have a uniform structure in the composition.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

With reference to the accompanied drawings, the following description will be directed to a preferred embodiment according to the present invention.

Example 1

This embodiment is to show a synthesizing method of a sintered polycrystal body of super ion conductive oxide $BaCe_{0.8} Gd_{0.2} O_{3-\alpha}$ and to show the testing result on the ion conductivity of the sintered body at a temperature ranging from 600° C. to 1000° C. in various atmospheres. The description is also directed to the chemical stability of the sintered body in the reducing atmosphere or in the moistured air atmosphere.

The oxide $BaCe_{0.8} Gd_{0.2} O_{3-\alpha}$ is synthesized by a solid state reaction. Raw materials comprise a mixture of barium acetate powder ($Ba(CH_3 COO)_2$), cerium oxide powder ($CeO_2$) and gadolium oxide powder ($Gd_2 O_3$) in a mole ratio of 1:0.8:0.1. The mixture is subjected to crushing and mixing process in an agitate mortar having ethanol solvent put therein. After mixing, the mixture is subjected to a solvent evaporation process and then is heated with a burner to remove oil component. The mixture is again subjected to crushing and mixing process in an agitate mortar having ethanol solvent put therein and is pressed into a cylinder form. The pressed body is heated at 1300° C. for 10 hours. The sintered body is roughly crushed and then is granulated into a fine particle of a particle size of 3 micron by using a planetary ball mill having benzene solvent put therein. The fine particle is dried in vacuum at 150° C. and then is pressed into a cylinder form by a pressure of 2 ton/cm². The pressed body is sintered at 1650° C. for 10 hours. The sintered body is in a polycrystal and has a density corresponding to 98% of the theoretical density and a grain size of 1 micron.

The sintered body of a cylinder form is cut into a disk of 0.5 mm thickness and 1.4 mm diameter. Platinum paste is applied to both surfaces of the disk to form an electrode of a size 0.5 mm² and is fired.

Figure 1:
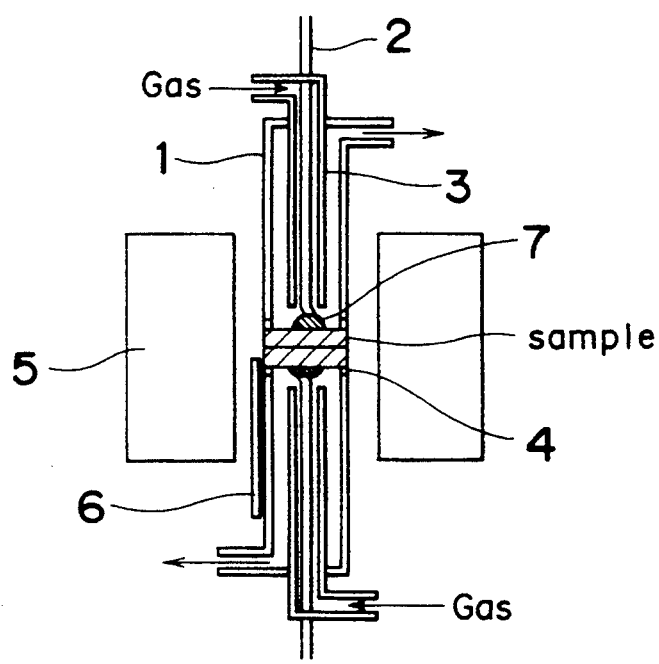
FIG. 1 is a cross sectional view of an equipment for measuring the conductivity of the mixing ion conductive material according to the present invention.

The disk is mounted to a measuring equipment shown in FIG. 1 and is measured with the electric conductivity under supplying various kinds of gases to the both electrodes. In FIG. 1, 1 is an almina tube, 2 is a platinum lead, 3 is a silica tube, 4 is a gas sealing member, 5 is a heater and 6 is a thermo couple.

Figure 2:
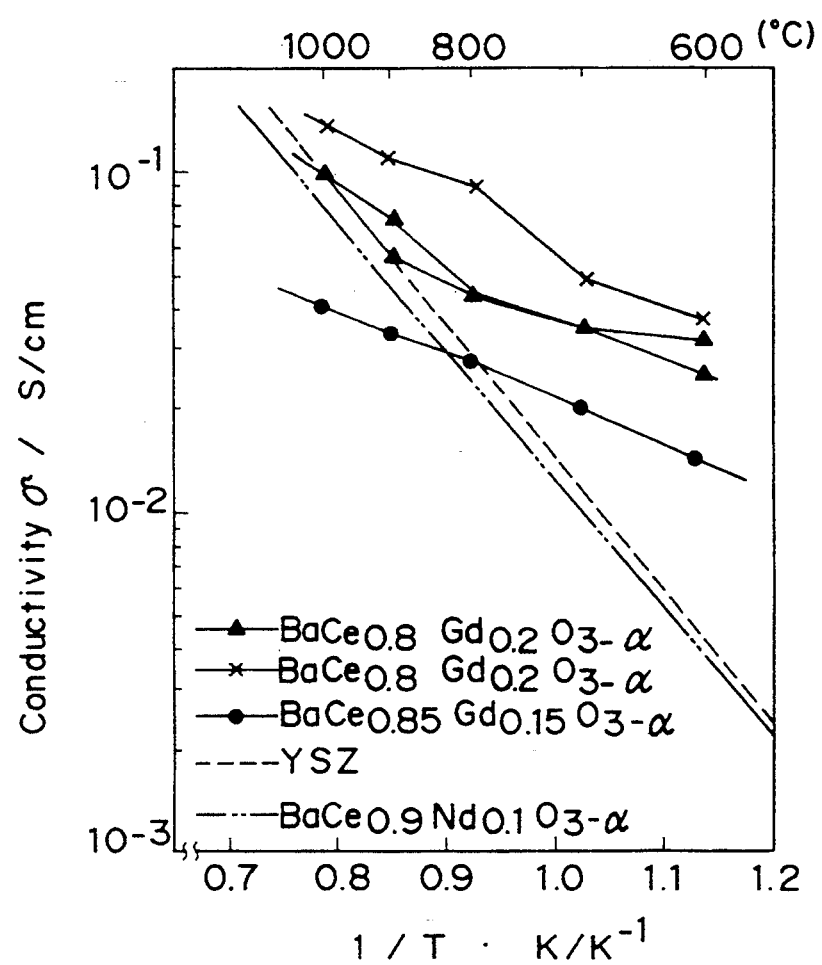
FIG. 2 is a graph showing a Arrhenius plot of the conductivity of the mixing ion conductive material according to the embodiment of the present invention.

The conductivity is calculated on the basis of a resistance obtained by an AC impedance method and is subjected to a correction for an effect of a resistance component due to the lead of the equipment. FIG. 2 is a graph showing an Arrhenius plot of the conductivity in a moistured air at a room temperature. It is clear from FIG. 2 that the oxide $BaCe_{0.8} Gd_{0.2} O_{3-\alpha}$ has a conductivity at 1000° C. to 900° C. nearly equal to that of yttrium stabilized zirconia (YSZ) which has indicated a most superior conductivity character at 1000° C. to 900° C. At a temperature below 900° C. the oxide of $BaCe_{0.8} Gd_{0.2} O_{3-\alpha}$ according to the present invention has a conductivity higher than that of YSZ. It may be considered that the conductivity of this oxide $BaCe_{0.8} Gd_{0.2} O_{3-\alpha}$ is resulted from protons, oxide cations, electrons and holes.

In order to classify the conductivity of this oxide into electron conductivity (electrons or holes) and ion conductivity, this oxide is used for formation of various gas concentration cell, that is, hydrogen concentration cell, oxygen concentration cell and oxygen-hydrogen fuel cell. Then, each electromotive force of these cell is measured. All of these cell show a theoretical value of the electromotive force. This indicates that the conductivity of this oxide is hardly dependent on the electron conductivity. An amount of water vapor generated from the fuel cell at a discharge time permits a determination what is the movable conducting particle for the fuel cell. The testing result indicates as follows: At 600° C., the conduction is mainly resulted from protons; at 1000° C., the conduction is mainly resulted from oxide cations and at a temperature from 600° C. to 1000° C., the conduction is resulted from both of protons and the oxide cations. It is further found that the oxide used in the fuel cell has the conductivity higher than that of the oxide in a moistured air.

The oxide of $BaCe_{0.8} Gd_{0.2} O_{3-\alpha}$ is kept at 1000° C. in a reducing atmosphere and an air atmosphere and also is kept at room temperature in air for 1000 hours. After that, the oxide is tested in connection with a variation in the surface condition and the conductivity characteristic. The testing result indicates that this oxide shows no variation in the surface condition and the conductivity and proves a high chemical stability.

As shown by this embodiment, it is clear that the oxide $BaCe_{0.8} Gd_{0.2} O_{3-\alpha}$ has a conductivity dependent on protons and oxide cations at a temperature range from 600° C. to 1000° C. and is very stable in the chemical property.

Example 2

This embodiment is carried out to clarify a relationship between the conductivity and a substitution value x (x=0.05 to 0.25) of gadolium in the oxide $BaCe_{1-x} Gd_x O_{3-\alpha}$, $(1.5 > \alpha > 0)$ in the perovskite structure.

Various mixtures corresponding to $BaCe_{1-x} Gd_x O_{3-\alpha}$, (x=0.05, 0.1, 0.15, and 0.25) are prepared and formed into sintered bodies of a cylinder form in a similar way to that of the embodiment 1. The sintered body is cut into a square column of 5×5×10 mm, to both surfaces of which in a longitudinal direction thereof platinum electrodes are applied by baking. The conductance measurement thereof is carried out.

Figure 3:
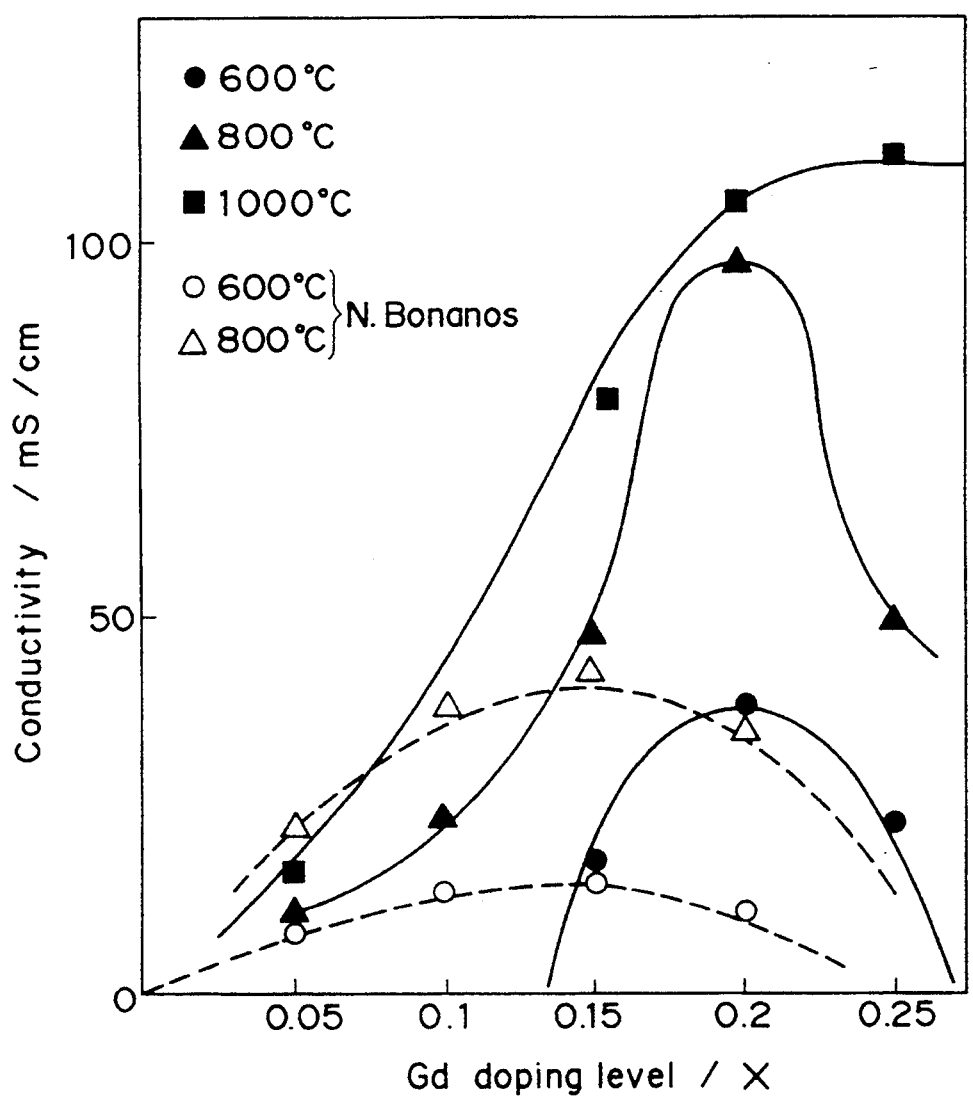
FIG. 3 is a graph showing a relationship between the conductivity and the gadolium substitution amount of the mixing ion conductive material according to the embodiment of the present invention.
Figure 4:
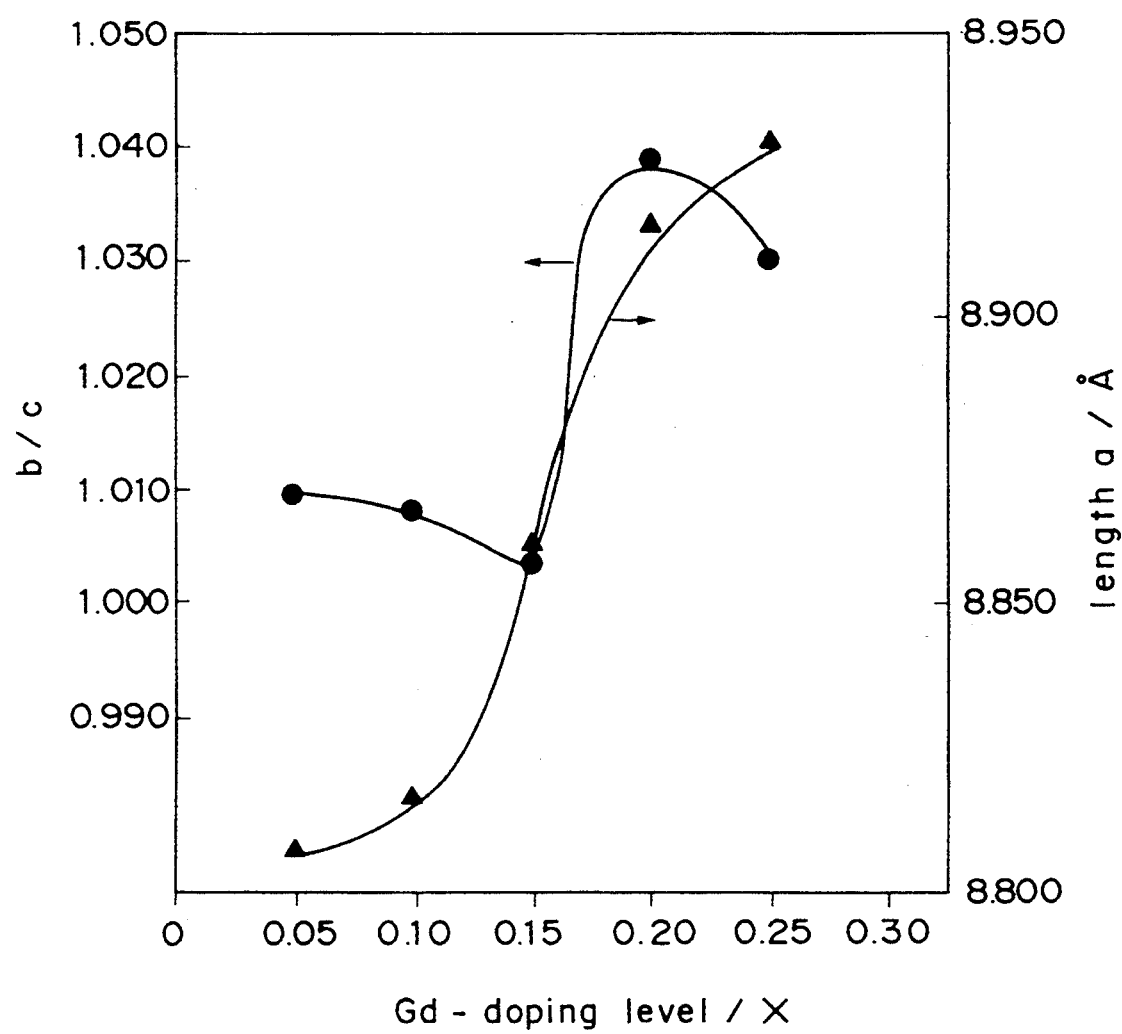
FIG. 4 is a graph showing a relationship between the dopped level of Gd and the crystal structure distortion b/c.

FIG. 3 is a graph showing a conductance of the resulting conductors at 1000° C., 800° C. and 600° C. in a humidity air at a room temperature against the gadolium substitution amount x. For comparison with the inventive conductor, the graph also shows a result reported by N. Bonanos and others. It is clear that the oxide according to the synthesizing method of the present invention differs in the physical property from the oxide reported previously. Further, it is clear that the oxide having the substitution amount of 20% shows the highest conductivity ever known. Fig, 3 indicates that the oxide having the gadolium substitution of 16 to 23% has a high conductivity and is a material practically usable.

As shown in this embodiment, it is found that the oxide having Gd substitution of 16 to 23% shows a high conductivity and a high chemical stability and is a superior ion conductor.

The sintered body of this embodiment according to the present invention has a density corresponding to 98% of the theoretical density and a grain size of one micron. The present invention has clarified that a superior characteristic can be obtained with the sintered body having a density more than 96.5% of the theoretical density and a grain size of 0.1 to 10 micron.

It is to be noted that the mixture is crushed into a powders in a particle size of 3 micron by using a planetary ball mill having benzene solvent put therein. However, it is possible to use any available crushing method. The solvent can be composed of any non-aqueous solvent such as toluene. The sintering temperature is 1500° C. in this embodiment, but can be any temperature between 1635° C. and 1665° C. Further, the present invention does not specifies the sintering time.

Example 3

This embodiment is carried out to clarify a relationship between the conductance, and a substitution value x (x=0.05 to 0.25) of Dysprosium in the oxide $BaCe_{1-x}Dy_x O_{3-\alpha}$, $(1.5 > \alpha > 0)$ in the perovskite structure and also the conductance and a distortion raio b/c of crystal lattice (orthrhomic system).

Various oxide samples are prepared in a same way as the above Example and are analized as to the structure by means of X-ray diffraction.

There is indicated a peak value (1.035) of the distortion b/c at the substitution value x=0.22. In the same sample, there is also indicated the ionic conductances of $1.6 \times 10^{-1}$ s/cm at 1000° C. and $9.5 \times 10^{-2}$ S/cm at 800° C. which is higher than that of a conventional ionic conductor oxides belonging to a zirconia system and a pervskite system. Therefore, it is apparent from the above results that the mixed ionic conductor of an oxide represented by the formula: $BaCe_{1-x} Dy_x O_{3-\alpha}$, has a higher ionic conductance at a larger distortion of the crystal lattice.

Same results are obtained in the case of using either heavy rare earth element of Tb, Ho and Er in the place of Dy.

Summerizing the above results from Examples 1 to 3, according to the present invention, there is obtained an oxide sintered body which is stable in the chemical and thermal property and has a high ion conductivity. Since the raw powders for use in the final heat treatment is specified in the particle size, it is possible to obtain a sintered body having a high density. The raw powders subjected to a nonaqueous solvent treatment and a vacuum drying process results in a sintered body stable in the chemical property. Since the sintering temperature is specified to the temperature range of a solid skate reaction, the sintered body is provided with a uniform composition.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A mixed ionic conductor which comprises an ion conductive oxide represented by the formula:

$$BaCe_{1-x}M_xO_{3-\alpha} \qquad (I)$$

wherein M is a rare earth element selected from the group consisting of Gd, Tb, Dy, Ho and Er; $1 > x > 0$ and $1.5 > \alpha > 0$, and comprising at least a proton conductivity and a perovskite crystal structure which is an orthorhombic crystal structure, wherein said orthorhombic structure has at least one of the lattice constant ratios b/a, c/a and b/c which exhibits a peak value resulting from the adjustment of the amount of M and particularly the lattice constant ratio of b/c is more than 1.010 as a result of such adjustment.

2. A mixed ionic conductor according to the claim 1, wherein the oxide is in a form selected from the group consisting of a pervskite system, a sintered system and a polycrystal system represented by the formula: $BaCe_{1-x} Gd_x O_{3-\alpha}$ and x is $0.23 > x > 0.16$ to provide the oxide with a proton conductivity and an oxide cation conductivity at a temperature ranging from 400° C. to 1000° C.

3. A mixed ionic conductor according to the claims 2, which comprises an oxide represented by the formula: $BeCe_{1-x} Gd_x O3-\alpha$ wherein x=0.2.

4. A mixed ionic conductor according to the claim 2, wherein the oxide is a sintered system having a density higher than 96.5% of the theoretical density.

5. A mixed ionic conductor according to the claim 2, wherein the oxide is a polycrystal having a grain size ranging from 0.1 μm to 10 μm.

* * * * *